United States Patent
Oatridge et al.

(10) Patent No.: US 6,675,467 B2
(45) Date of Patent: Jan. 13, 2004

(54) AUTOMOTIVE MANUFACTURING SYSTEM

(75) Inventors: Mike Oatridge, Barrie (CA); Darin Vojin, Alliston (CA); Nari Hirase, Suzuka (JP); Mitsuhiro Kimura, Newmarket (CA); Takaaki Niwa, Nakabettpo (JP)

(73) Assignees: Honda Giken Kogyo Kabushiki Kaisha, Tokyo (JP); Honda Canada Incorporated, Scarborough (CA)

( * ) Notice: Subject to any disclaimer, the term of this patent is extended or adjusted under 35 U.S.C. 154(b) by 69 days.

(21) Appl. No.: 10/010,347

(22) Filed: Dec. 5, 2001

(65) Prior Publication Data

US 2002/0056189 A1 May 16, 2002

Related U.S. Application Data (62) Division of application No. 09/354,875, filed on Jul. 16, 1999, now Pat. No. 6,360,421.

(51) Int. Cl.⁷ .................................. B23P 21/00
(52) U.S. Cl. ........................... 29/771; 29/783; 29/712
(58) Field of Search .................. 29/897.2, 430, 29/464, 469, 771, 783, 786, 791, 794, 824, 407.04, 407.09, 407.1, 720, 721, 712; 228/212, 49.1

(56) References Cited

U.S. PATENT DOCUMENTS

| | | |
|---|---|---|
| 3,348,300 A | 10/1967 | Lindgren |
| 4,441,645 A | 4/1984 | Takagishi et al. |
| 4,448,341 A | 5/1984 | Fujikawa et al. |
| 4,604,797 A | 8/1986 | Kitamura et al. |
| 4,805,286 A | 2/1989 | Uchida et al. |
| 5,010,634 A | 4/1991 | Uemura et al. |
| 5,061,009 A | 10/1991 | Harasaki et al. |
| 5,072,506 A * | 12/1991 | Dacey, Jr. .................. 29/712 |
| 5,106,148 A | 4/1992 | Ikeda et al. |
| 5,143,270 A | 9/1992 | Hamada et al. |
| 5,148,591 A | 9/1992 | Pryor |
| 5,168,453 A | 12/1992 | Nomaru et al. |
| 5,203,073 A | 4/1993 | Kotake et al. |
| 5,230,137 A | 7/1993 | Abe |
| 5,267,683 A | 12/1993 | Hamada et al. |
| 5,319,840 A | 6/1994 | Yamamoto et al. |
| 5,561,902 A | 10/1996 | Jacobs et al. |
| 5,619,784 A | 4/1997 | Nishimoto et al. |
| 5,774,969 A * | 7/1998 | Zuccato .................. 29/407.05 |
| 6,163,946 A | 12/2000 | Pryor |

FOREIGN PATENT DOCUMENTS

| | | |
|---|---|---|
| EP | 0 117 976 | 9/1984 |
| EP | 0 438 989 A1 | 7/1991 |
| EP | 0 492 673 A1 | 7/1992 |
| GB | 2 191 977 | 12/1987 |
| GB | 2 308 103 | 6/1997 |

* cited by examiner

Primary Examiner—Gregory Vidovich
Assistant Examiner—Jermie E. Cozart
(74) Attorney, Agent, or Firm—Christensen O'Connor Johnson Kindness PLLC (57) ABSTRACT

A method and system for the manufacture of an assembly, such as an automobile body-in-white or sub-assembly, that comprises a plurality of components is disclosed. Selected from the plurality of components are components which can form an initial rigid structure. These selected components are then positioned relative to each other with reference to at least one reference point on at least one of the selected components. These selected components are then affixed to one another, by, for example, spot welds to form the initial structure. The non-selected components are then positioned relative to the same reference point and attached to either the initial structure or a component that was affixed in an earlier process. An assembly, such as an automobile body-in-white, will have reduced manufacturing tolerances when compared to the body-in-white manufactured in a conventional manner.

11 Claims, 10 Drawing Sheets

PRIOR ART

PRIOR ART

AUTOMOTIVE MANUFACTURING SYSTEM

CROSS REFERENCE TO RELATED APPLICATIONS

This is a division of application Ser. No. 09/354,875, filed Jul. 16, 1999 now U.S. Pat. No. 6,360,421 the content of which is hereby incorporated by reference.

FIELD OF THE INVENTION

The invention relates to a system of manufacturing and, more particularly, a method and system for improving the quality of the assemblies and sub-assemblies of an automobile.

BACKGROUND TO THE INVENTION

A conventional automobile assembly line produces a variety of sub-assemblies that are integrated to form a complete vehicle. For example, typical modern vehicles, such as a sedan, have a body-in-white which is comprised of a front or engine room sub-assembly, a passenger cell sub-assembly and a trunk or rear sub-assembly. Typically, a front sub-assembly will be attached to the passenger cell sub-assembly at a first assembly station on the main assembly line. The front and passenger cell sub-assemblies are usually affixed to each other by spot welds or bolts. The rear sub-assembly is then attached to the front/passenger cell assembly at a second assembly station on the main assembly line.

The sub-assemblies themselves are typically produced on a sub-assembly line, which may or may not be at the same location as the main assembly line. A sub-assembly is typically produced by affixing, typically by spot welds, a number of components, parts or pieces (which terms, hereinafter, will be used interchangeably). For instance, the front or engine room assembly typically comprises left and right front housings (which include the left and right wheel wells and shock towers), left and right frame rails, a fire-wall or dashboard component and a radiator cradle. In a typical sub-assembly line, separate left and right front fender sub-assemblies, typically comprising the front frame rails and front housings, are formed by placing the individual components into a jig at a first weld station and spot welding these components to form separate left and right fender sub-assemblies. The left and right front fender sub-assemblies are then joined together by a dashboard component to form a U-shaped structure (when viewed from overhead). This U-shaped structure is then moved to another sub-assembly line station for the installation of the radiator cradle. Further components which form part of the engine room or front sub-assembly may also be added.

Conventionally, the components which form the sub-assemblies are themselves typically comprised of a number of folded, stamped, rolled, extruded, or hydroformed pieces which are affixed to each other to form the component. These components may be produced off-site by the vehicle manufacturer or by a supplier.

In conventional assembly lines (including sub-assembly lines), many of the assembly steps require parts to be physically stacked on top of one another and then secured to each other by, for example, welds or bolts. Each of these components is formed with a certain accuracy or tolerance. That is, a particular component, and any point on that component, is typically required to have, or be located at, certain dimensions, within a specified tolerance, (i.e.±1 mm, for example). If a component to be affixed references a point or another component, the reference point also having a dimensional tolerance, the tolerance in the assembly formed by these components will be also be "stacked" together. That is the dimensional tolerance of the first component will be added, to some degree, to that of the second component. As more components are affixed to the assembly which reference additional points, the tolerances of the individual points are "stacked" to create a larger total tolerance for the "stacked" component.

The positioning of these components spatially and relative to one another and prior to fixation is typically accomplished through the use of jigs. By way of explanation, a jig typically has pins and templates, (or location devices, such as cavities, for example) to receive parts, and clamps, to maintain parts in position prior to welding. However, a jig typically allows some play in the positioning of the parts prior to clamping (such as ±0.3 mm). As a result, the use of additional jigs conventionally incurs a quality penalty. That is, for each jig used, an addition positional tolerance is conventionally incurred. As a result, in a conventional assembly line, each additional jig used to spatially hold parts together prior to welding causes the positional tolerance of that jig to be added, in some degree, to the total tolerance of the final product. Accordingly, it becomes evident that an increase in the number of components whose positional and dimensional tolerances are stacked causes the total manufacturing tolerance to increase. It is evident that as the number of "stacking" processes increases the total manufacturing tolerance can become quite substantial.

As is well known in the automotive industry, the demand for higher quality vehicles at a lower cost is increasing. It is not uncommon for customers to demand quality tolerances for visibly apparent quality measures, such as body panel gaps, of less than 3 mm. However, it is not uncommon for some assembly processes to have twenty or thirty welding stations using twenty, or more, positioning jigs.

Accordingly, it is desired to improve the manufacturing method by reducing the overall or total tolerance in sub-assemblies and vehicle assemblies.

SUMMARY OF THE INVENTION

According to an aspect of the invention, there is provided an assembly line, comprising: an initial station with means for forming a substantially rigid initial structure from a plurality of components; at least one additional station downstream of said initial station, each of said at least one additional station including: referencing means for referencing or positioning additional components relative to said initial structure; and affixing means for affixing each additional component to said initial structure at a position referenced by said referencing means.

According to another aspect of the invention, there is provided an assembly line, comprising: an initial station with means for forming a substantially rigid initial structure from a plurality of components; a plurality of additional stations downstream of the initial station, each of the plurality of additional stations including: referencing means for referencing additional components to the initial structure; and affixing means for affixing each additional component in abutting relation to the initial structure at a position referenced by the referencing means.

In a particular case, the assembly line may include a plurality of additional stations which are serially arranged. In another particular case, the plurality of components forming the initial structure may be positioned relative to a reference point on one of the plurality of components. In still another particular case, the assembly line may be for manufacturing vehicle sub-assemblies. In yet another particular case, the referencing means may be one or more of: a jig; a vision system; and a handling robot. Similarly, the means for affixing the additional components may be one or more of: welding, adhesives, bolts, rivets, joints and fasteners. Still further, the assembly line may include a plurality of sub-assembly lines, based on the assembly line of the embodiments, for the assembly of a plurality of sub-assemblies, and further include assembly means for referencing and affixing the manufactured sub-assemblies to one of the initial structures manufactured on one of the plurality of sub-assembly lines.

According to another aspect of the invention, there is provided an assembly line for manufacturing an assembly from a plurality of components. The assembly line comprises: an initial station for forming a substantially rigid initial structure from selected components of the plurality of components; at least one additional station, downstream of the initial station, that comprises: a component positioner for positioning non-selected components of said plurality of components relative to a reference point defined on said initial structure; and an affixer for affixing said non-selected components to at least one of said initial structure and another of said non-selected components.

In a particular case according to this aspect of the invention, the plurality of components may be a plurality of sub-assemblies. Further, the assembly line may be for manufacturing vehicle assemblies.

In the embodiments according to the invention, the formation of an initial substantially rigid structure with a reference point significantly reduces the amount of total manufacturing tolerance introduced during the assembly process as the assembly is transported from processing station to processing station. Moreover, the amount of dimensional tolerance in the manufacture is reduced by reducing the number of independent reference points used.

BRIEF DESCRIPTION OF THE DRAWINGS

The present invention will be more clearly understood after reference to the following detailed specification read in conjunction with the drawings wherein.

Elements labelled with a prime symbol "'" in Figures which illustrate embodiments of the invention reference similar numbered components on conventional assembly lines which do include the prime symbol.

DETAILED DESCRIPTION OF THE PREFERRED EMBODIMENTS

It should be understood that the word "assembly" includes, but is not limited to, assemblies, sub-assemblies, final assemblies, and the like.

Figure 1:
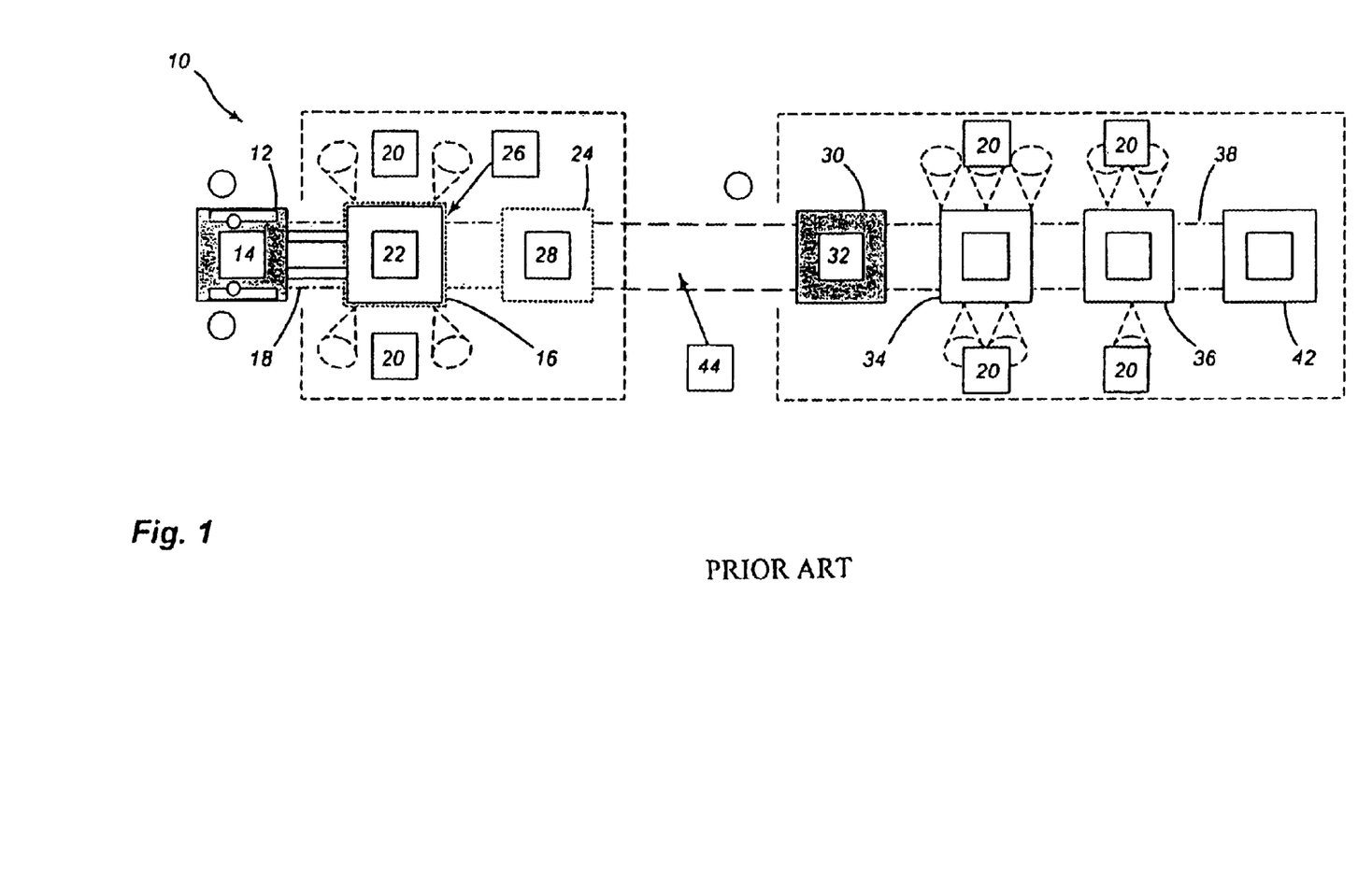
FIG. 1 is schematic of a conventional assembly line for the production of a front engine room sub-assembly.

A conventional front or engine room sub-assembly line 10 is illustrated in FIG. 1. Sub-assembly line 10 comprises a first parts loading station 12 housing front wheel house set jig 14, shown in its "home" position. Front wheel house jig 14 is moveable, by transfer track 18, between first parts loading station 12 and first welding station 16. Located on either side of first welding station 16 are welding robots 20. First welding station 16 houses secondary welding jig 22. Moveable between first welding station 16 and first unloading station 24 is upper transfer robot 26. Located at unloading station 24 is unloading jig 28 which is moveable between first unloading position 24 and second parts loading station 30. Second parts loading station 30 houses the front component set jig 32. Downstream of second parts loading station 30 is second welding station 34. Located on either side of second welding station 34 are welding robots 20. Downstream of second welding station 34 is third welding station 36. On either side of third welding station 36 are welding robots 20. Further downstream of third welding station 36 is final unloading station 42 of the front or engine room sub-assembly line 10. Transferring a partially completed sub-assembly between first unloading station 24 and second parts loading station 30 is overhead linear transfer system 44. Transferring the sub-assembly between third welding station 36 and final unloading station 42 is lift-and-carry transfer mechanism 38.

In operation of the sub-assembly line 10, parts (namely left and right front housings and frame rails) are loaded, typically by an associate (i.e. an assembly line worker) or by automation, into front wheel house set jig 14 located at first parts loading station 12 and clamped into place. Front wheel house jig 14 is then transferred, by track 18, into first welding station 16. At first welding station 16 the parts clamped into front wheel house set jig 14 are spot welded together by welding robots 20 to form separate left and right fender sub-assemblies. The welded parts are then removed from front wheel house set jig 14 by upper transfer robot 26. Front wheel house set jig 14 is then returned to its home position at first parts loading station 12 by track 18.

The left and right fender sub-assemblies are then lowered by upper transfer robot into secondary welding jig 22 located at first welding station 16. Secondary welding jig 22 presents to welding robots 20 at welding station 16 different aspects of the partially completed sub-assembly for further spot welding. Upon completion of the secondary spot welding, the partially completed sub-assembly (i.e. the engine room sub-assembly) is removed from secondary welding jig 22 and transferred to unloading jig 28 at first unloading station 24 by upper transfer robot 26. The welded components (left and right fender sub-assemblies) are then conveyed, by overhead linear transfer system 44 into front component set jig 32 at second parts loading station 30. An associate loads and clamps into front component set jig 32 additional parts, such as the dashboard component and the radiator cradle. The front component set jig 32, which now houses the left and right fender sub-assemblies and the clamped, but unwelded, dashboard and radiator cradle components, is transferred by lift-and-carry transfer mechanism 38 to second welding station 34. Welding robots 20 at second welding station 34 apply additional spot welds securing the clamped, but heretofore unwelded dashboard component, connecting the left and right fender sub-assemblies to form a U-shaped structure (when viewed from overhead).

The U-shaped structure is then transferred, by lift-and-carry transfer mechanism 38, to third welding station 36 where robots 20 complete the welding operation of the front engine room sub-assembly by affixing the radiator cradle to connect the open end of the U-shaped structure. The now complete engine room sub-assembly is then transferred to final unloading station 42 by lift-and-carry transfer mechanism 38.

As will be apparent, the transfer of the partially completed U-shaped structure between: second parts loading station 30 to second welding station 34; and second welding station 34 and third welding station 36; by lift-and-carry transfer mechanism 38, typically causes distortion of the partially completed sub-assembly. This distortion may be caused by the forces applied by transfer mechanism to the partially completed sub-assembly. The distortion typically induces a further manufacturing tolerance into the completed sub-assembly since the components do not form a rigid structure but, rather, the components are separate pieces (at second welding station 34) or form a flexible U-shaped structure (at third welding station 36).

In many instances, especially on sub-assembly lines incorporating several parts loading stations, the positioning of to-be-added parts is made with reference to a component forming part of the partially completed sub-assembly. In turn, this referenced component may, at an earlier welding station, have been positioned and secured to the partially completed sub-assembly with reference to an earlier positioned and secured component. This earlier positioned and secured component may itself have been positioned with reference to a third component that was earlier affixed to the partially completed sub-assembly, and so on. In such an instance, the total manufacturing error or tolerance will be proportional to the sum of the tolerances of each of the components so "stacked". The tolerances so stacked will include a factor accounting for the positional accuracy or tolerance of the jig and a dimensional tolerance corresponding to the accuracy of the reference point relative to its ideal location on a component. That is, the formation of a reference point, which may be a mark, hole or other identifying feature, on a part, will be "off" relative to its ideal position.

This "stacking" process is exemplified by assembly line 10, illustrated in FIG. 1. Specifically, the left and right fender sub-assemblies are initially manufactured separately and then joined together at station 34 by the dashboard component to form a U-shaped structure. The dashboard component is positioned by a jig with respect to the fender sub-assemblies since the fender sub-assemblies are not connected. Moreover, the position of the radiator cradle is determined relative to this U-shaped structure, which has tolerances that are dependent upon the placement of the dashboard component. The margin of error of positioning and welding a new component to a partially completed sub-assembly increases the overall margin of error. That is, each component's positional tolerance is "stacked" or added, in some proportion, to the total positional tolerance of the sub-assembly line.

The standard deviation of the total positional tolerance of a completed sub-assembly (hereinafter "total positional tolerance") can be estimated according to the following formula:

$$\text{Total Positional Tolerance} = \sqrt{\sum_{i=1}^{n} x_i^2} \quad (1)$$

where:

$X_i$=Positional Tolerance of $i^{th}$ Process n=Number of Positional Tolerance Inducing Processes It should be noted that equation (1) estimates only the positional tolerance. That is, the tolerances inherent in the manufacturing process that are caused, or result from, the positioning of the individual components relative to one another Equation (1) does not account, nor include, the dimensional tolerances of the individual components. The estimated total standard deviation for the entire manufacturing process (hereinafter the "the total manufacturing tolerance") can be calculated from equation (2):

$$\text{Total Manufacturing Tolerance} = \sqrt{\sum_{i=1}^{n} x_i^2 + \sum_{j=1}^{m} y_j^2} \quad (2)$$

where:

$X_i$=Positional Tolerance of $i^{th}$ Process n=Number of Positional Tolerance Inducing Processes $y_j$=Dimensional Tolerance of $j^{th}$ Process m=Number of Dimensional Tolerance Inducing Processes Conventionally, each time separate components are positioned relative to one another in a jig, the jig will add to the manufacturing tolerance. Assembly line 10 has at least two manufacturing processes which add to the positional tolerance, namely the adding of parts at both the first loading station 12 and the second loading station 30 into two separate jigs, respectively. Consequently, the total number of positional tolerance adding manufacturing processes is two (i.e. n=2). Assuming that the positional tolerance for each of these two processes is±0.3 mm, the approximate total positional tolerance would be±0.42 mm, according to equation (1). However, positional tolerances, introduced by the two set jigs (jigs 14 and 22), are not the only tolerances which may be "stacked" in this conventional process. The left and right fender sub-assemblies, formed separately from left and right wheel housings and frame rails, are manufactured using a reference point on each of these sub-assemblies (i.e. m=2). As a result, these referenced points typically have dimensional tolerances that must be added to the positional tolerances calculated to be±0.42 mm. Accordingly, the total tolerance (which will be a function of both positional tolerances, due to the use of multiple tolerance inducing jigs, and dimensional tolerances, by use of multiple reference points) is far greater than that calculated by equation (1). The total manufacturing tolerance, using equation (2), where n=2, m=2, and the dimensional and positional tolerance for each process is±0.3 mm, is±0.6 mm. This latter total manufacturing tolerance does not account for any additional tolerances that may have been incurred due to damage, misalignment or the like, caused by distortions in the position of components relative to one another during the manufacturing process. For example, transferring the U-shaped component from second welding station 34 to third welding station 36 may have damaged this flexible structure or alter the position of the tips of the "U" relative to each other. This damage is typically incurred due to the structure's inherent flexibility.

Figure 2:
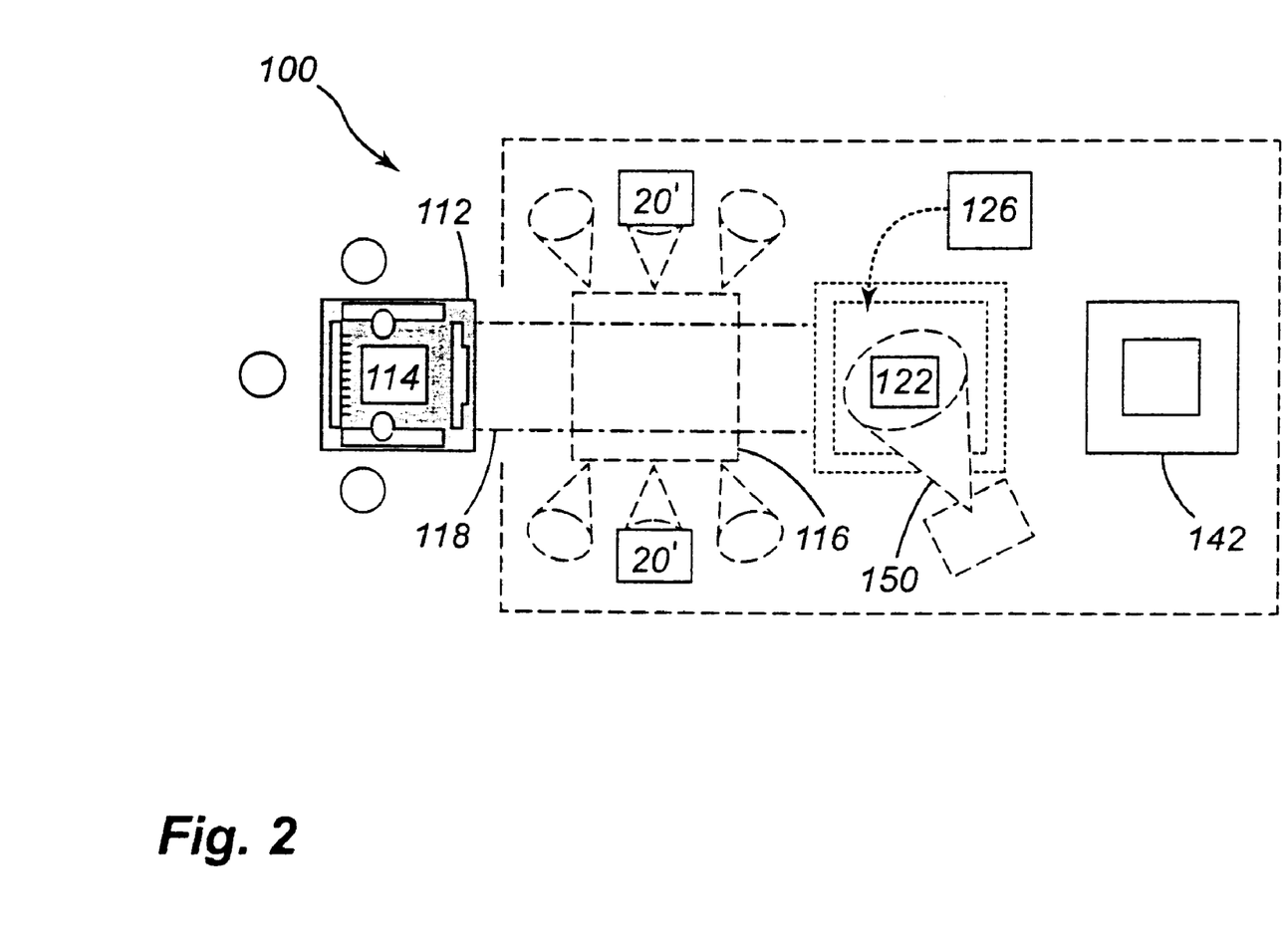
FIG. 2 is a schematic plan view of an embodiment of the invention illustrating the production of a front engine room sub-assembly.
Figure 3:
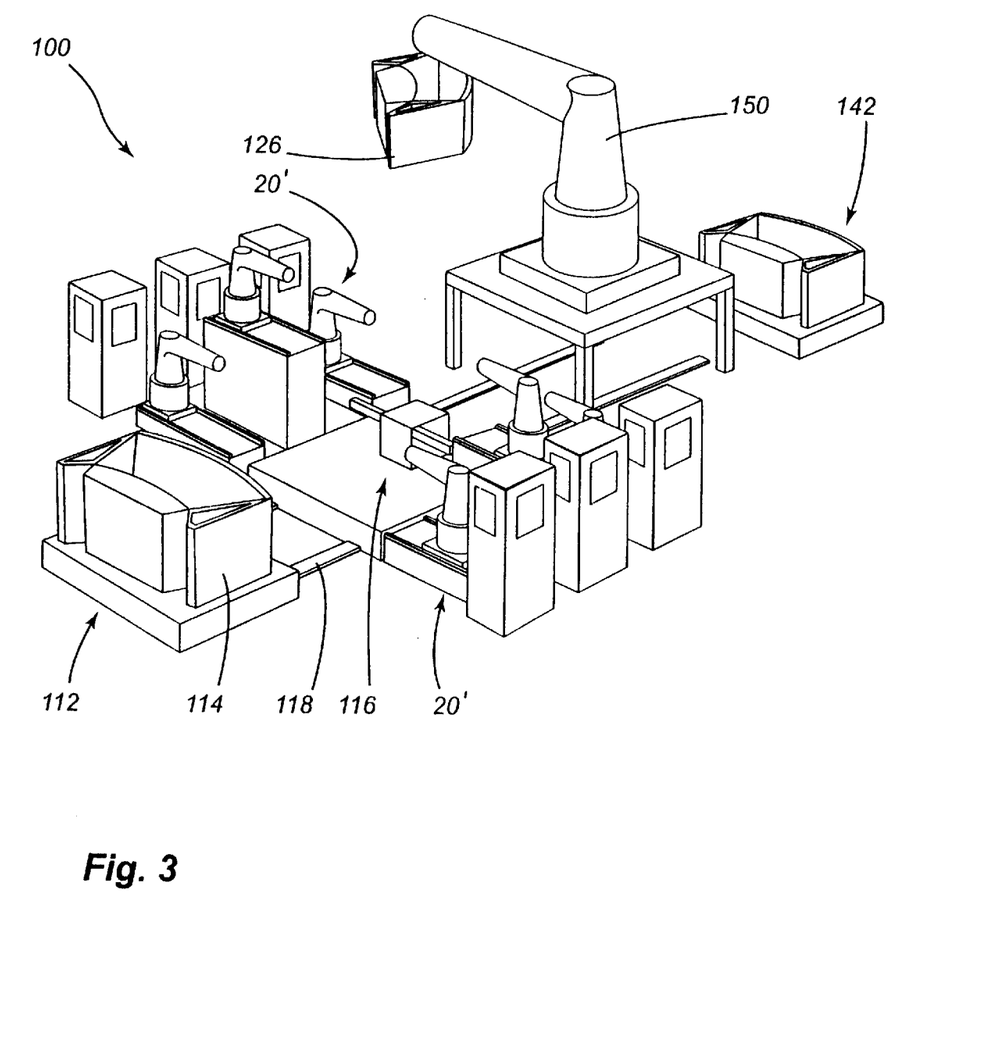
FIG. 3 is a schematic perspective view of the embodiment of FIG. 2.

Referencing FIGS. 2 and 3, automobile front component or engine room sub-assembly line 100, exemplary of one embodiment of the invention, for the manufacture of an engine room sub-assembly, is illustrated. A first parts loading station 112 houses a front component set jig 114. Front component set jig 114 is moveable between first parts loading station 112 and welding station 116 by transfer track 118. Located on either side of welding station 116 are robot welders 20'. Located proximate to the downstream side of welding station 118 is handling robot 150. Downstream of handling robot 150 is front complete unloading station 142. The components, such as robot welders, welding stations, and the like, are known in the art.

As illustrated in FIG. 3 handling robot 150 handles secondary welding jig 126.

Figure 4:
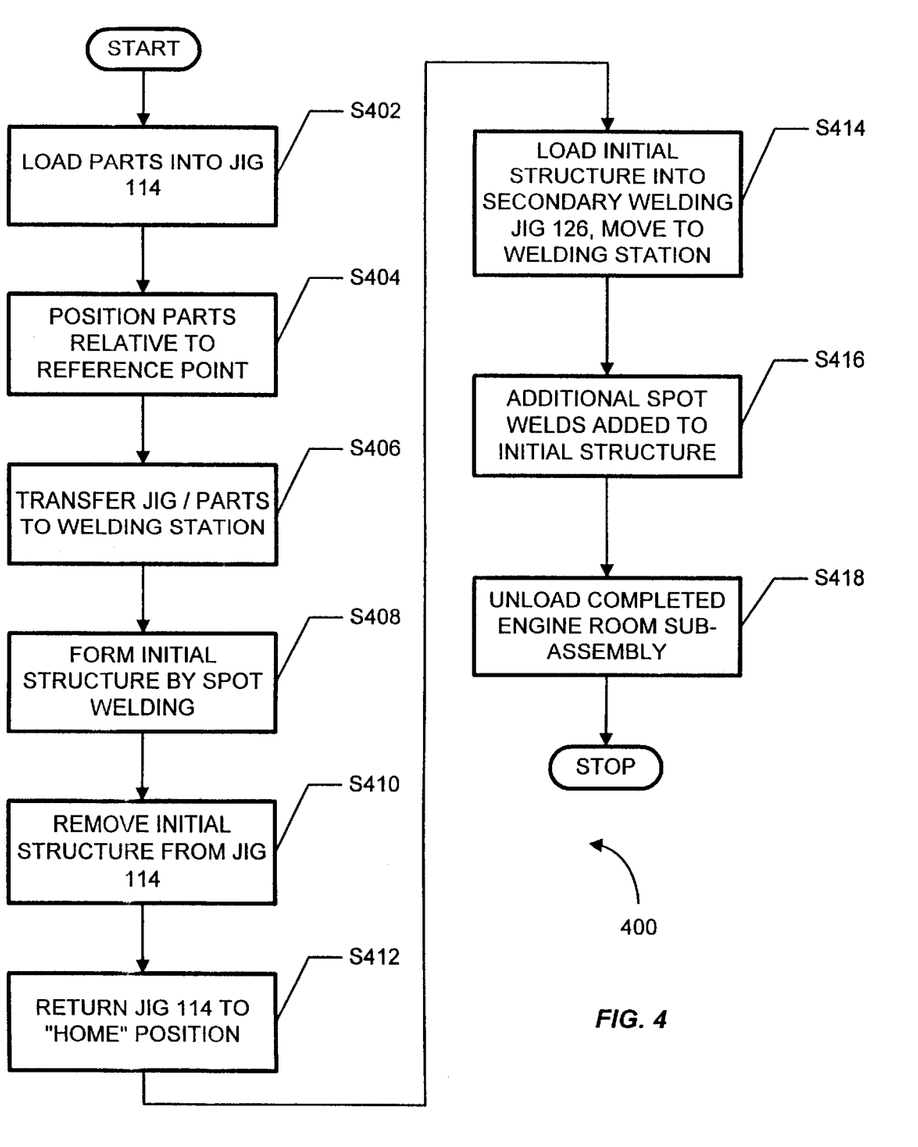
FIG. 4 is a flow chart illustrating the operations of the production of the sub-assembly of FIGS. 2 and 3.

With reference to FIGS. 2, 3 and 4, the operation of automobile sub-assembly line 100 comprises the loading of single parts (namely left and right front housings, left and right frame rails, a fire-wall or dashboard component and a radiator cradle), by an associate or through automation, into front component set jig 114 at parts loading station 112 (S402). The jig 114 may be designed with some "play" in the position of the parts so that the position of the parts may be adjusted with reference to a single reference point (having an assumed dimensional tolerance of±0.3 mm) on a reference part (or with reference to the reference part itself) prior to clamping (S404). A reference point identifies a position or place on a part or component. As described above, a reference point may be identified by a hole, a visual marker, a target, a groove or slot in a component or any other type of identifier. Alternatively, the reference part may be designed to guide additional parts into position as the parts are abutted against the reference part by jig 114. After clamping, front component set jig 114 is transferred, via transfer track 118 (or alternatively, a conveyor system or the like), to welding station 116 (S406). At welding station 116, welding robots 20' spot weld the individual parts or components into an initial structurally rigid partially complete sub-assembly (S408). In this manner the quality of this structurally rigid sub-assembly is fixed or set. That is, transporting the rigid sub-assembly in a conventional manner, will not alter the relative positions of the components, unlike the U-shaped structure formed on conventional assembly line 10. Handling robot 150 removes the partially complete, though substantially rigid, sub-assembly from front component set jig 114 (S410). Jig 114 is then returned, by transfer track 118, to its "home" position at parts loading station 112 (S412). The partially complete sub-assembly is then loaded, by handling robot 150, into second welding jig 126 (which is initially located beside the assembly line). Both jig 126 and the partially completed sub-assembly are then moved by robot 150 to, and placed at, welding station 116 (S414). Secondary welding jig 126 presents to welding robots 20' areas not previously accessible for welding. Handling robot 150 also assists in positioning the partially completed sub-assembly in space, so that welding robots 20' can apply additional welds. In an alternative embodiment, handling robot 150 could position the components of the engine room sub-assembly prior to any welding in place of jigs 114 and 126. It should be noted that secondary welding jig 126 does not re-align nor re-position any of the individual components loaded in S402 and therefore does not add or introduce any additional manufacturing tolerance to the system or method (i.e. n=0 for S416). Subsequently, welding robots 20' perform additional spot welds on the sub-assembly (S414). The completed sub-assembly is then transferred by handling robot 150 to front complete unloading station 142 where it is available for incorporation into a vehicle (S418).

As should be apparent, the quality or total positional tolerance of the final sub-assembly is determined when the parts are initially loaded into front component set jig 114, which parts are then welded into an initial structurally rigid partially complete sub-assembly (S404–S408). The welding performed in S414 does not alter the sub-assembly's quality or positional tolerance but only seeks to reinforce the structure by welding additional areas that were previously (i.e. in S408) not accessible due, for example, to the physical constraints of jig 114 or to time constraints.

The total positional tolerance of operations of FIG. 4 can then be calculated using equation (1). Assuming that the initial positional tolerance of the single reference point or reference part (S404) is±0.3 mm relative to jig 114. Since only one jig (jig 114) is used to position the components relative to each other, the number of tolerance adding processes is one (i.e. n=1). Using equation (1) the approximate total positional tolerance is±0.3 mm, which is approximately 30% less than the positional tolerance calculated for the assembly processes illustrated in FIG. 1. Similarly, since a single reference point is used in the manufacture of the engine room sub-assembly, m=1. Assuming that the dimensional tolerance of the single reference point is±0.3 mm, the total manufacturing tolerance, estimated by equation (2), is ±0.424 mm, or approximately 30% less than conventional assembly line 10. As will be discussed in detail below, as the number of manufacturing processes increases, the total manufacturing tolerance in a conventional assembly line (or process or system) increases proportionally. In contrast, the total manufacturing tolerance in an assembly line, process or system employing the invention remains substantially constant or is substantially lower than a conventional assembly line even as the number of components increases.

The full extent of the improved quality resulting from embodiments of the invention can be better appreciated with reference to FIGS. 5–9.

Figure 5:
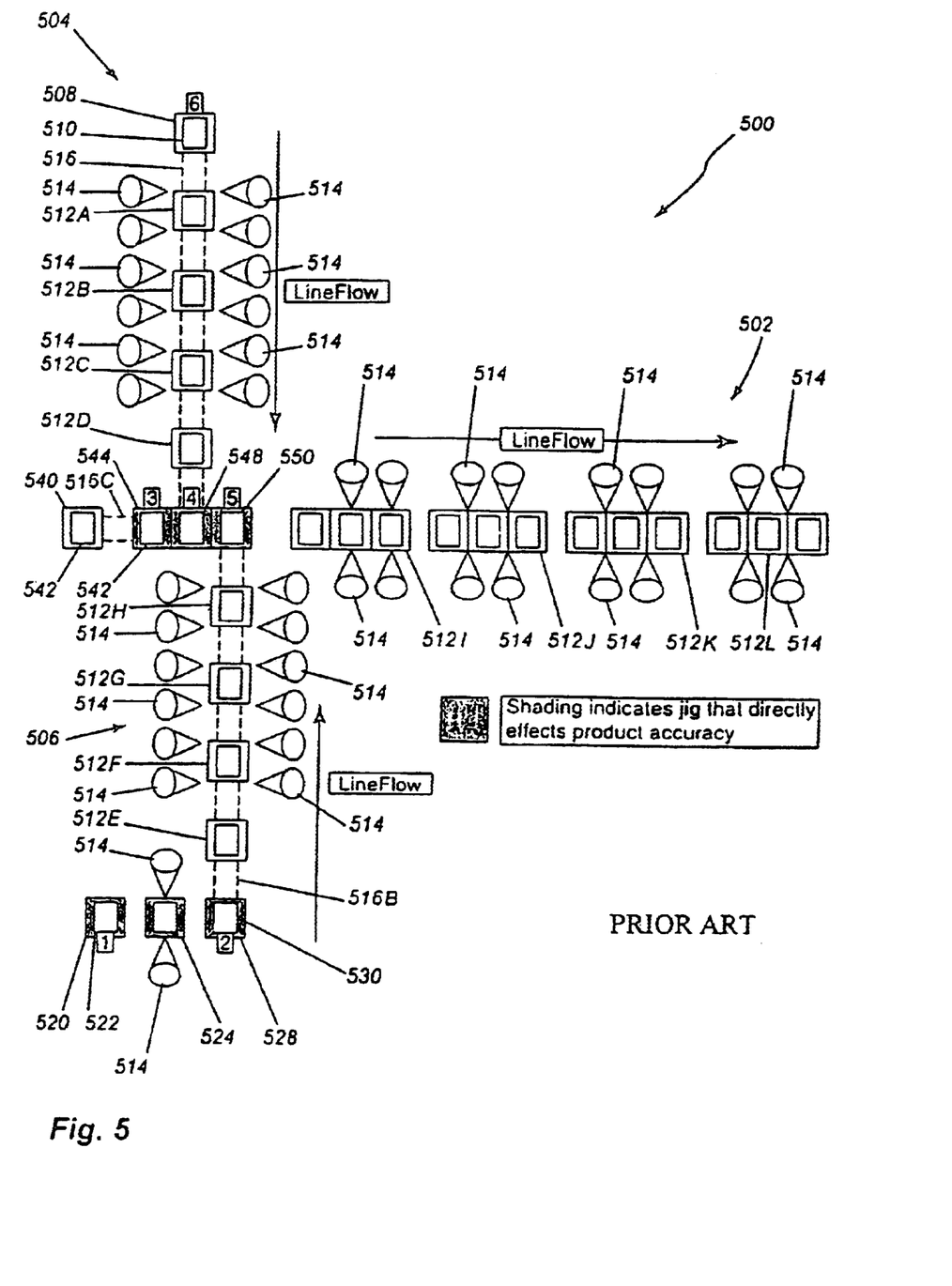
FIG. 5 is schematic of a conventional assembly line for the production of a frame sub-assembly.

FIG. 5 illustrates, schematically, a conventional assembly line 500 for the production of a frame assembly. Assembly line 500 comprises a main assembly line 502, a mid-floor sub-assembly line 504 and a rear floor sub-assembly line 506.

Mid-floor sub-assembly line 504 produces a mid-floor sub-assembly that supports the main passenger cell of the finished vehicle. Mid-floor sub-assembly line 504 comprises a first parts loading station 508 housing a mid-floor component set jig 510. Downstream of first parts loading station 508 is a plurality of welding stations 512A through 512D, which have disposed on either side welding robots 514. Mid-floor sub-assembly line 504 terminates at main assembly line 502.

Mid-floor component set jig 510 is moveable from first parts loading station 508 through welding stations 512A through 512D by a transfer mechanism, which may be, for instance, a conveyor system or the like.

In operation of mid-floor sub-assembly line 504 parts, such as left and right floor panel extensions, third seat panel, third seat stiffener, left and right floor panel stiffeners, second, third and fourth mid-floor panel cross-members, left and right rear frame components and a rear floor panel cross-member, are loaded and clamped into mid-floor component set jig 510 at parts loading station 508 by an associate or through automation. The parts loaded at parts loading station 508 will be positioned in the jig within a specified positioning tolerance, such as, for example, ±0.3 mm with the common reference point used having a dimensional tolerance of ±0.3 mm. Component set jig 510 is then transferred, by transfer mechanism 516, to each of the plurality of welding stations 512A through 512D for spot welding by welding robots 514. The completed mid-floor sub-assembly is then transferred to mid-floor sub-assembly set jig 548 at sub-assembly loading station 544 of main assembly line 502, which is described in greater detail below. It should be noted that conventional sub-assembly line 504 does not typically produce until a very late station (i.e., a station proximate to main assembly line 502) a substantially rigid structure. As a result, the position of components relative to each other may not be fixed until this late stage. Consequently, the transport of the partially completed mid-floor sub-assembly through the various processes may, and typically does, alter, and significantly increase the total manufacturing tolerance of mid-floor sub-assembly. As a result the quality of the mid-floor sub-assembly is reduced.

Transporting partially completed mid-floor sub-assemblies from station to station is transfer mechanism 516, which may be, for example, an overhead conveyor.

In parallel with the operation of mid-floor sub-assembly line 504, rear floor sub-assembly line 506 operates to manufacture a rear floor sub-assembly. Rear floor sub-assembly line 506 comprises a rear floor panel parts loading station 520 which houses a rear floor panel component set jig 522. Downstream of rear floor panel parts loading station 520 is first floor welding station 524. Disposed on either side of first floor welding station 524 are welding robots 514. Further downstream of first floor welding station 524 is rear floor frame parts loading station 528 which houses rear floor frame component set jig 530. Downstream of rear floor frame parts loading station 528 are a plurality of secondary welding stations 512E through 512H. Disposed on either side of each of secondary welding stations 512E through 512H are welding robots 514. Rear floor sub-assembly line 506 terminates at main assembly line 502. Similar to mid-floor sub-assembly line 504, rear floor sub-assembly line 506 does not typically produce until a very late station (i.e., a station proximate to main assembly line 502) a substantially rigid structure. As a result, the position of components relative to each other may not be fixed until this late stage. Consequently, the transport of the partially completed rear-floor sub-assembly through the various processes may, and typically does, alter, and significantly increase the total manufacturing tolerance of rear-floor sub-assembly. As a result the quality of the mid-floor sub-assembly is reduced.

The operation of rear floor sub-assembly line 506 follows a now-familiar pattern. Parts, such as front floor panel cross-member, left and right front frame components, and first mid-floor panel cross-member, are loaded, by automation or by an associate, into rear floor panel component set jig 522 at rear floor panel parts loading station 520 and clamped therein. The jig has receptors (cavities, slots, openings, or the like) for each of the parts, which spatially positions the parts relative to one another. During this operation, a positional tolerance is introduced into the system by the tolerance inherent in component set jig 522, which may be, for example, ±0.3 mm, with the reference point used in the manufacture of the rear floor sub-assembly also having a dimensional tolerance of ±0.3 mm. Component set jig 522, and the parts positioned and clamped thereto, are transferred to first floor welding station 524 where spot welds are applied by welding robots 514 to secure the individual parts to each other forming a partially completed floor panel sub-assembly. The partially completed floor panel sub-assembly is then transferred to rear floor frame component set jig 530 at rear floor frame parts loading station 528.

Additional rear floor frame parts, such as spare tire well component, spare tire cross-member, rear floor panel patch component and rear bracket component, are then loaded and clamped into frame component set jig 530 by automation or by an associate. As frame component set jig 530 inherently has a certain amount of tolerance in the positioning of the individual components, a further positional tolerance, such as, for example, ±0.3 mm, will be incurred by the loading process at rear floor frame parts loading station 528. Moreover, and as described above and with reference to FIG. 1, additional parts, such as those added at parts loading station 528, may be positioned with respect to multiple reference points on the partially completed floor panel sub-assembly manufactured at first floor welding station 524. Each of the reference points used may have a certain amount of tolerance with respect to its ideal position. Accordingly, conventional line 506 will introduce a second dimensional tolerance of ±0.3 mm for the second reference point used in positioning the parts into set jig 530. As a result of using multiple reference points, the tolerance of the floor panel sub-assembly on sub-assembly line 506 will include two positional and two dimensional tolerances (i.e., n=2, m=2).

The unwelded frame components and the partially completed floor panel sub-assembly are then transferred, again by transfer mechanism 516B, to a plurality of welding stations 512E through 512H where spot welds are applied by robots 514 to form a rear floor sub-assembly which is then transferred to rear floor sub-assembly set jig 550 at sub-assembly loading station 544, which is described in greater detail below.

Main assembly 502 comprises an engine room parts loading station 540 housing engine room component set jig 542. Downstream of engine room parts loading station 540 is sub-assembly loading station 544. Sub-assembly loading station 544 houses three separate jigs, namely: engine room component set jig 542; mid-floor sub-assembly set jig 548; and rear floor sub-assembly set jig 550. Further downstream are a plurality of welding stations 512I through 512L with welding robots 514 disposed on either side.

Main assembly line 504 commences operation by the loading and clamping of engine room parts, such as left and right front housings, left and right frame rails, a fire-wall or dashboard component, radiator cradle, and front cross-member, by automation or by an associate, into engine room component set jig 542 at engine room parts loading station 540. Engine room component set jig 542 is moveable from engine room parts loading station 540 to sub-assembly loading station 544 by way of transfer mechanism 516C. The loading of parts into component set jig 542 will introduce a positional tolerance due to the jig's inherent (in) accuracy, which may, for example, be accurate within±0.3 mm. Moreover, the reference point used in positioning the parts in set jig 542 will introduce a dimensional tolerance into the system of, for example, ±0.3 mm. The completed mid-floor and rear floor sub-assemblies are loaded, typically through automated mechanisms, into mid-floor sub-assembly set jig 548 and rear floor sub-assembly set jig 550, respectively, which are also located at sub-assembly loading station 544. As will now be apparent, sub-assembly jigs 548 and 550 will, due to the inherent tolerance of the jigs, add to the total positional tolerance of the final vehicle. Moreover, the positioning of the completed mid-floor and rear floor sub-assemblies and the parts into component set jig 542 may be made with respect to a number of different reference points. As a result, and as a described above, the use of multiple reference points, each of which may have a certain amount of dimensional tolerance. This dimensional tolerance will be added, in some proportion, to the total tolerance of the completed assembly.

The total positional tolerance imparted to the vehicle manufactured by conventional assembly line 500 can be estimated by equation (1), where n=6 (i.e., there are six (6) jigs used in assembly line 500), and each jig has a positional tolerance of±0.3 mm. Using equation (1), the estimated total positional tolerance is calculated to be at least±0.735 mm. As described above, this tolerance of±0.735 mm only accounts for the positional accuracy of the jigs used. It does not, however, account for the dimensional tolerance of each of the multiple reference points used on assembly line 500. As a result, the total tolerance of the manufactured assembly on assembly line 500 will, typically, be much greater than±0.735 mm. Applying equation (2), where m=6, and each dimensional tolerance has been assumed to be±0.3 mm, the total manufacturing tolerance can be estimated at±1.039 mm.

Figure 6:
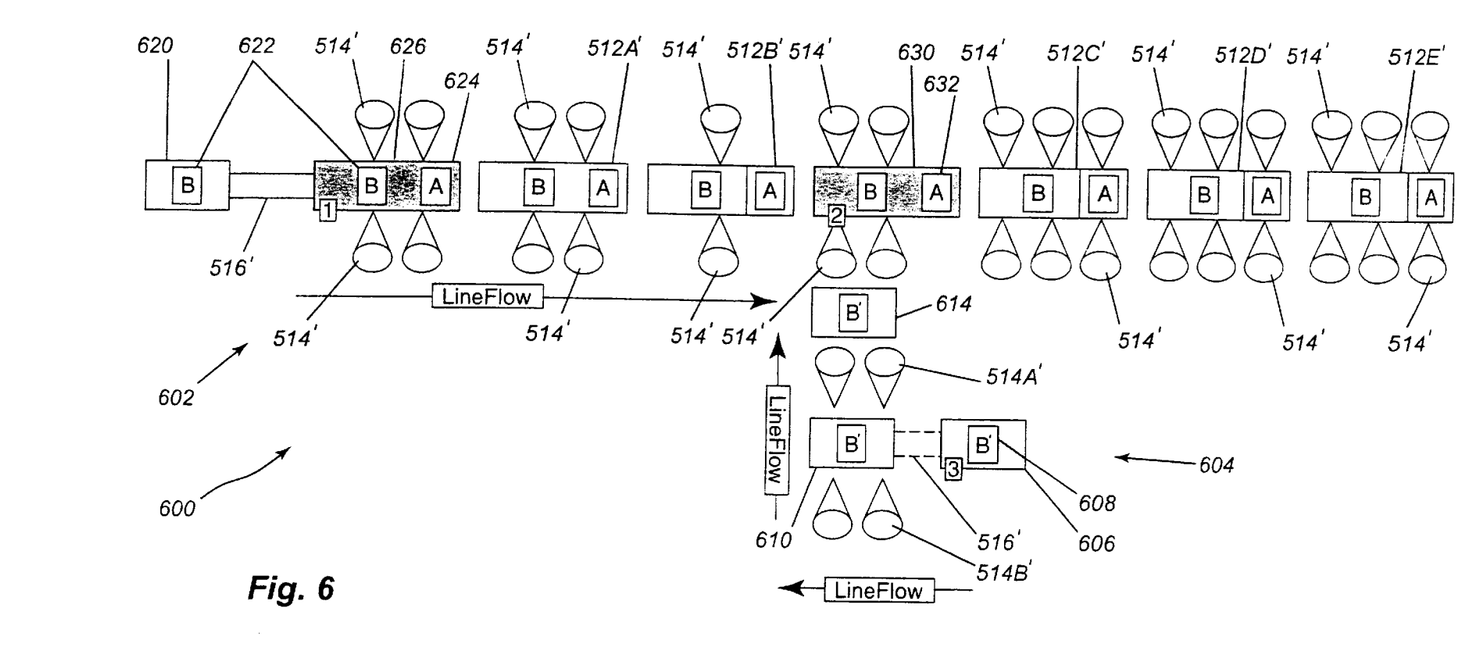
FIG. 6 is a schematic plan view of an embodiment of the invention illustrating the production of a frame sub-assembly.
Figure 7:
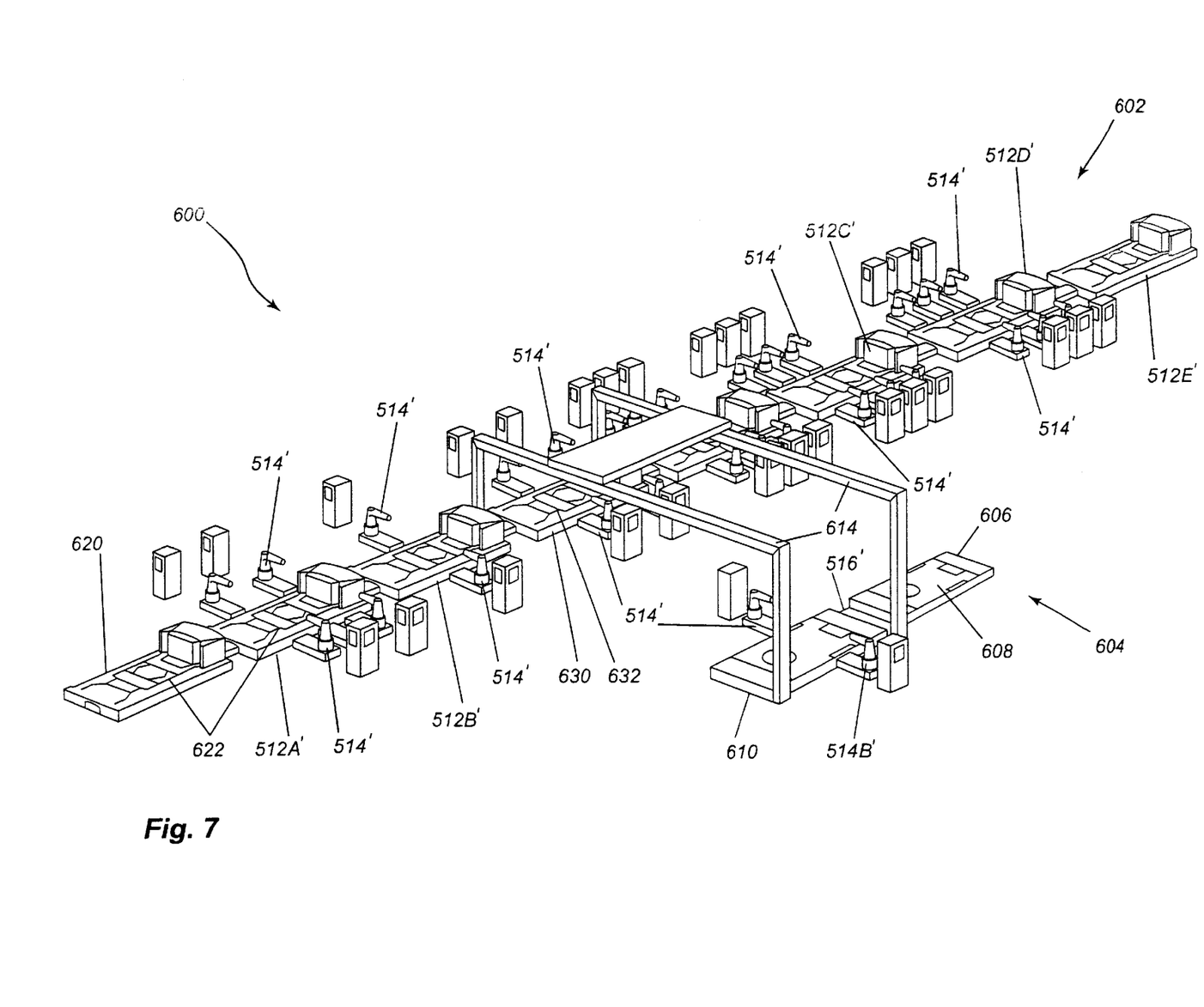
FIG. 7 is a schematic perspective view of the embodiment of FIG. 6.

In contrast to the conventional assembly line and process illustrated in FIG. 5, FIGS. 6 and 7 illustrate an embodiment of the present invention as assembly line 600. Assembly line 600 comprises engine room/floor frame main assembly line 602 and floor panel sub-assembly line 604.

Floor panel sub-assembly line 604 comprises a floor panel parts loading station 606 which houses floor panel component set jig 608. Floor panel component set jig is moveable between floor panel parts loading station 606 and the downstream floor panel welding station 610 by transfer mechanism 516'. Disposed on either side of floor panel welding station 610 are welding robots 514'. The floor panel assembly manufactured at floor panel welding station 610 is moveable, by overhead conveyor 614, between floor panel welding station 610 and sub-assembly welding station 630, which is described in greater detail below.

Engine room/floor frame main assembly line 602 comprises component loading station 620 housing a floor frame and engine room sub-assembly set jig 622. Set jig 622 is moveable, by transfer mechanism 516B', from loading station 620 downstream to first positioning and welding station 626. Set jig 622 has clamping positions for floor frame components and a front or engine room sub-assembly. First positioning and welding station 626 is flanked on either side by welding robots 514'. Downstream of first positioning and welding station 626 are a plurality (as illustrated, two) welding stations 512A' and 512B' which, in the usual manner, have welding robots 514' positioned on either side. Downstream of the plurality of welding stations 512A' and 512B' is sub-assembly welding station 630 which houses floor frame/engine room and floor panel set jig 632. As described above, overhead conveyor 614 terminates at sub-assembly station 630 and feeds floor panel sub-assemblies from floor panel sub-assembly line 604 to main assembly line 602. Flanking either side of sub-assembly welding station 630 are welding robots 514'. Following sub-assembly welding station 630 are a plurality of welding stations 512C' through 512E', each of which are flanked by welding robots 514'.

The processes of main assembly line 602 for the manufacture a frame assembly are typically operated in parallel to the processes for the manufacture of a floor panel sub-assembly on floor panel sub-assembly line 604.

Figure 8:
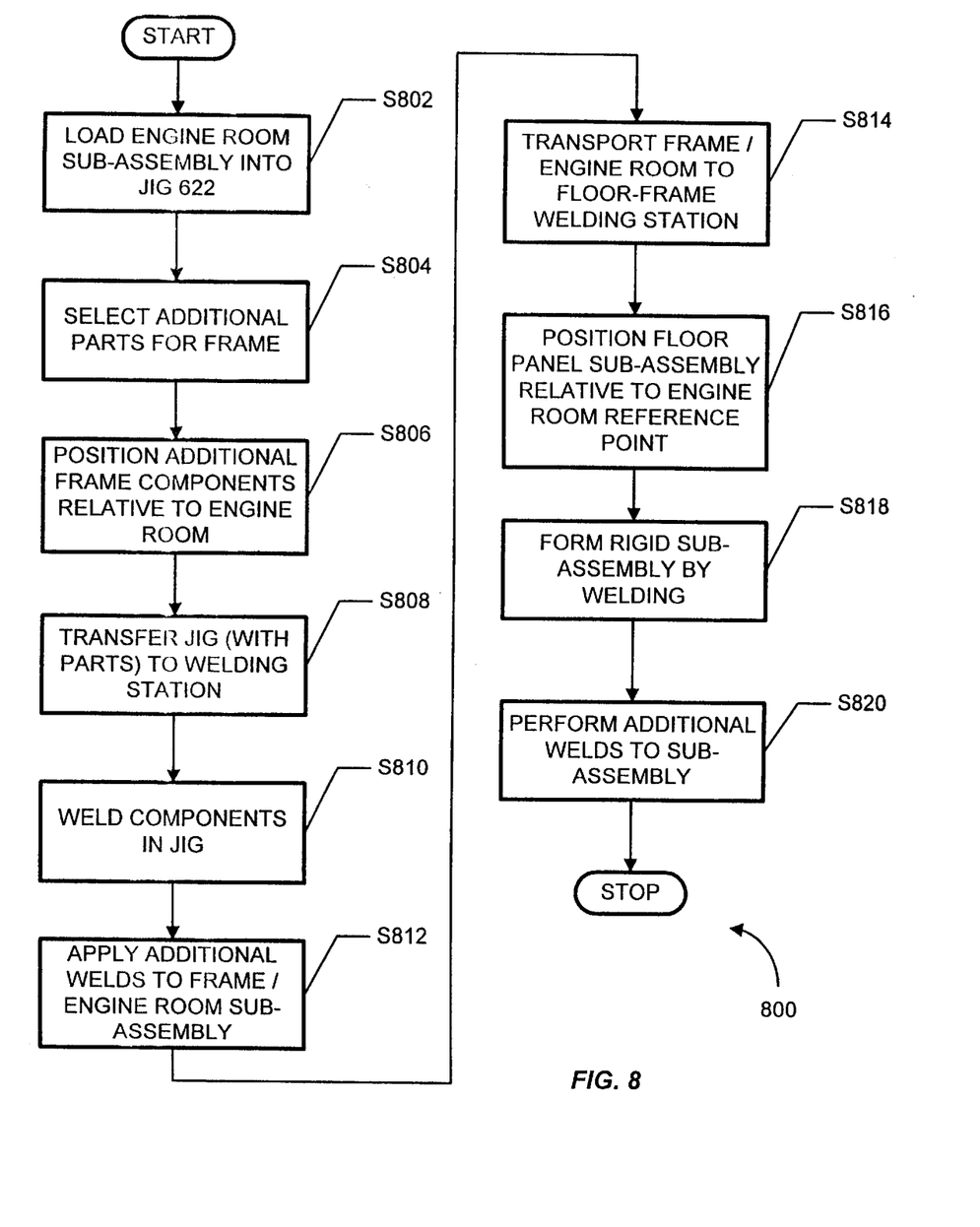
FIGS. 8 and 9 are flow charts illustrating the operations of the production of the sub-assembly of FIGS. 6 and 7.
Figure 9:
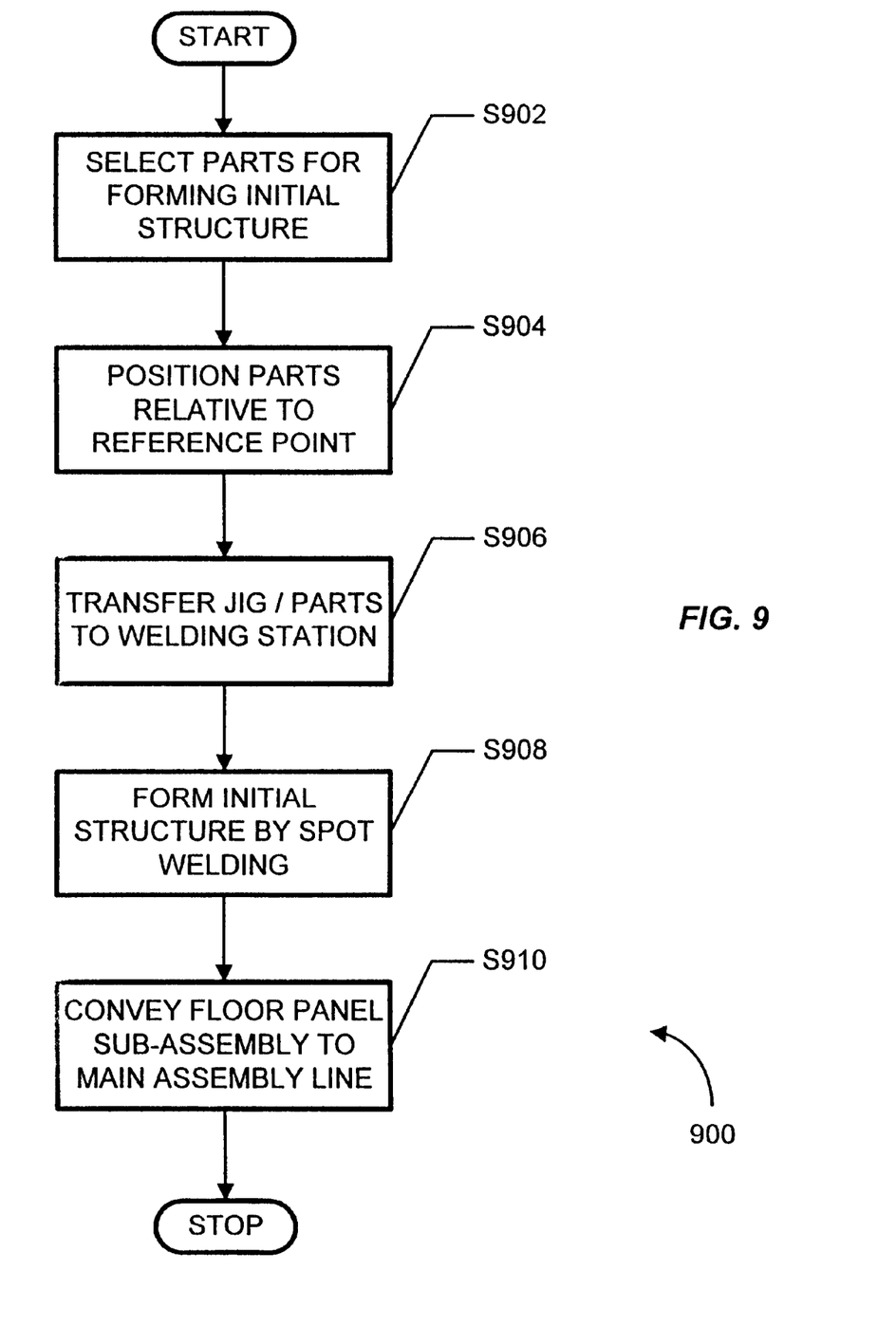

Operation of assembly line 600 is best understood with reference to FIGS. 6, 7, 8 and 9. Operation of floor panel sub-assembly line 604 is illustrated in the flowchart of FIG. 9. In S902, the parts, such as the floor panel, left and right floor panel extensions, third seat panel, third seat stiffener, left and right floor panel stiffeners, spare tire well, spare tire well cross-member, floor panel patch component and bracket component, which comprise the floor panel sub-assembly are selected from the floor panel sub-assembly parts that were used on conventional assembly line 500 at stations 508 and 528. The selected parts are positioned relative to a reference point (S904) which is located on one of the parts selected in S902 (although, if necessary, several reference points on one or more of the parts in S902 may be used at the risk of somewhat greater dimensional tolerances). The reference point referred to in S904 may be, for example, indicated by a reference hole, marking, target or other identification point. In the instant example, a robot or associate positions, in space, the unwelded components of the floor panel sub-assembly with reference to the reference point with the assistance of floor panel component set jig 608. The positioning performed in S904 introduces a positional tolerance into the manufacturing line (that is, the positional tolerance can be estimated as±0.3 mm, n=1 for S904). Moreover, the reference point used in S904 will introduce a dimensional tolerance of, for example, ±0.3 mm (i.e., m=1 for S904). Once so positioned, the components of the floor panel sub-assembly, clamped within floor panel component set jig 608, are moved by transfer mechanism 516' from floor panel parts loading station 606 to floor panel welding station 610 (S906). The components clamped to floor panel component set jig 608 are then affixed to each other by welding robots 514' to form a second initial, and substantially rigid structure (S908). The floor panel sub-assembly manufactured in steps S902–S908 is then transferred by overhead conveyor 614 from panel welding station 610 to sub-assembly station 630 on main assembly line 602 (S910). The operations of FIG. 9 are then repeated as necessary.

FIG. 8 illustrates operations of main assembly line 602, and its interaction with front or engine room assembly line 100 (FIGS. 2 and 3) and floor panel sub-assembly line 604. An engine room sub-assembly is transferred from engine room sub-assembly line 100 to component loading station 620 (S802) and placed into engine room sub-assembly set jig 622. As described previously, the manufacture of the engine room sub-assembly introduced a positional tolerance of±0.3 mm since the number of tolerance adding processes was one (n=1), despite the use of two separate jigs and a total assembly tolerance of±0.424 mm (i.e., m=1, n=1).

The conveyance of the engine room sub-assembly to component loading station 620 may be realised through operation of a conveyor mechanism (not shown in the Figures). As will be recalled, the components which form the engine room sub-assembly were positioned relative to a reference point located on one of the engine room components. Additional parts, such as front floor panel cross-member, left and right front frame components, first second, third and fourth mid-floor cross-members, left and right rear frame components and rear floor panel cross-member, which ultimately form part of the floor frame, are then selected to form the floor frame portion of the final frame assembly (S804). The selected parts are then positioned, again manually by the associates or through automation, into engine room sub-assembly set jig 622 relative to same the reference point (or points) on the engine room sub-assembly used in the manufacture of the engine room sub-assembly (S806). (The positioning of the components relative to the reference point(s) on engine room sub-assembly in S806, may, alternatively, be accomplished through the use of other frame component positioners such as, for example, robotic vision systems, handling robots, placing a to-be-added component in a cavity or slot in the reference sub-assembly, or the like). Consequently, S806 only introduces a single additional positional tolerance equal to that of the tolerance of the positioning system, here jig 622, into the assembly process (i.e., n=1, m=0 for S806). That is, no additional dimensional tolerance in S806 is introduced into the system since the positioning of all components has been made with reference to a single point on the engine room sub-assembly, the dimensional tolerance of which has already been accounted for in the manufacture of the initial engine room sub-assembly. In contrast, and as described above, conventional assembly processes, such as conventional assembly line 500, in addition to the tolerance of the positioning system, such as jigs 510, 522, 530, 542, 548 and 550, additional tolerances corresponding to the accuracy of the individual reference points are typically introduced to the system. These additional dimensional tolerances corresponding to the accuracy of the reference points add to the total manufacturing tolerance produced by assembly line 500 since the added components did not reference a single initial reference point. Rather, assembly line 500 references many difference reference points during manufacturing. As a result, each of the points referenced adds a certain amount of dimensional inaccuracy which will be added to the positional tolerance of the component positioning system, such as the jigs.

The components, that is the engine room sub-assembly and the frame components, are then transferred by transfer mechanism 516B to first positioning and welding station 626 (S808). The parts in engine room sub-assembly set jig 622 are then welded together by welding robots 514' to a sufficient degree to form a structurally rigid structure and set the quality of the sub-assembly. That is, the frame components that were placed into jig 622 are welded by robots 514' (S810), to create a rigid enough structure such that transporting the partially welded and partially completed sub-assembly will not alter the relative positions of the components which form the sub-assembly. In contrast, in the operation of conventional assembly line 500, the parts that ultimately form the completed sub-assemblies may be transported through a number of welding stations prior to being affixed to the sub-assembly. Accordingly, each of the transporting processes of conventional assembly line 500 may incur an additional manufacturing tolerance which is not accounted for in either equation (1) or (2). For example, as described above, conventional assembly line 500 forms sub-assemblies for the right and left fender sub-assemblies early in the assembly process. These left and right fender sub-assemblies are only affixed to one another to form a rigid sub-assembly much later in the assembly process. In contrast, the partially completed assembly formed in S808 is structurally connected and substantially rigid early in the manufacturing process thereby setting the overall quality of the (sub-)assembly early in the manufacturing process. That is, the relative positions of its components will not be altered during the assembly process since the components have been selected and welded (in S804 and S808, respectively) to form substantially rigid structure that can maintain its structural integrity during further processes.

Additional welds are then applied to complete the engine room/frame sub-assembly at welding stations 512A' and 512B' by welding robots 514' (S812). Upon completion of S812, the engine room/frame sub-assembly is transported to welding station 630 which houses floor frame/engine room and floor panel set jig 632 (S814). As described above, overhead conveyor 614 terminates at, and transports the floor panel sub-assembly manufactured in steps S902–S908 to, sub-assembly station 630. The floor panel sub-assembly line is then positioned in floor frame/engine room and floor panel set jig 632 with reference to a reference point (or points) of a component (or components) of the initial rigid engine room sub-assembly structure (S816) and is preferably the same reference point(s) used in the manufacture of the engine room sub-assembly. As a consequence of this positioning, no additional dimensional tolerances in incurred by S816. That is, the total or overall manufacturing tolerance has already accounted for mis-positioning of components relative to the reference point of the engine room sub-assembly. Moreover, despite the floor panel sub-assembly being physically stacked on top the now welded frame components, the floor sub-assembly is positioned relative to the engine room sub-assembly's reference point in jig 632, which incurs a positioning tolerance. Nevertheless, the floor panel sub-assembly references a reference point on the engine room sub-assembly which, as discussed above, has already had its dimensional tolerance taken into account (i.e., n =1, m=0 for S816). Consequently, no further dimensional tolerance is incurred. Moreover, the operation performed at step S816 ensures that any dimensional tolerances in the assembly of the frame or the floor panel do not impact the total dimensional tolerance, or the impact of the dimensional tolerances is reduced when the total manufacturing tolerance for the entire assembly process (operations of FIGS. 4, 8 and 9) is calculated. The frame/engine room and floor panel sub-assemblies are then welded together, by welding robots 514', to form a rigid, although not yet complete, frame component sub-assembly (S818). The welds applied by welding robots 514' are performed so that the individual components are sufficiently affixed to each other to form a substantially rigid sub-assembly which will maintain its high quality as the sub-assembly is moved from welding station to welding station. The partially completed frame assembly is then transported through a plurality of welding stations 512E' through 512E' where welding robots 514' apply the necessary and remaining welds (S820).

As will be now apparent, the frame assembly manufactured on assembly line 600 has been manufactured from three main sub-assemblies. Each of the these sub-assemblies is initially formed to be a substantially rigid structure. For example, the engine room sub-assembly was initially constructed to be a substantially rigid structure. Similarly, a second sub-assembly, the engine room/floor frame sub-assembly is also initially manufactured at welding station 626 (S810) into an substantially rigid structure. Finally, and similarly, the floor panel sub-assembly is also initially constructed to be a substantially rigid structure at welding station 610 (S908).

Operations described in FIGS. 4, 8 and 9 include the use of five jigs: front component set jig 114; secondary welding jig 126; floor frame and engine room sub-assembly set jig 622; floor panel component set jig 608; and floor frame/ engine room and floor panel set jig 632. As described above, the use of each of these jigs on conventional assembly lines typically introduces additional positional tolerances or margins into the finished component. In the operations of FIGS. 4, 8 and 9, a first positional tolerance is introduced in S402 through the use of the front component set jig 114 and the first use of the engine room sub-assembly's reference point. However, secondary welding jig 126 does not, at S414, introduce an additional positional or dimensional tolerance since the engine room is substantially rigid at this point, and the individual components have been fixed relative to one another (at S404–S408). A second positional tolerance is incurred by use of floor frame and engine room sub-assembly set jig 622 (S802). A third and fourth positional tolerance is introduced by the use of the floor frame and engine room sub-assembly set jig 622 (S806) and the frame/engine room sub-assembly jig 630 (S816), respectively.

A first dimensional tolerance is introduced by reference to a first reference point of the engine room sub-assembly. A second dimensional tolerance is introduced at S904 by positioning the floor panel components in floor panel component set jig 608 relative to a new reference point. However, because reference points are, where possible, used repeatedly, the amount of dimensional tolerance introduced into the manufacturing system is substantially reduced. When reference is made to a previously used reference point, the dimensional tolerance introduced by using the reference point will have already been taken into account. As a result, further reference to an already referenced point will not add, or stack, an additional dimensional tolerance into the assembly line. For example, where the manufacture of the engine room/floor frame assembly on conventional assembly lines 10 and 500 introduced eight dimensional tolerances (i.e., m=8), the invention embodied in assembly lines 100 and 600 introduced only two dimensional tolerances (i.e., m=2). As described previously, the individual sub-assemblies are, where possible, manufactured with reference to the same reference point.

Accordingly, despite using five jigs in the manufacturing of the frame assembly, only four dimensional tolerances are introduced (i.e., n=4). The total positional tolerance (assuming each jig is accurate to±0.3 mm) can be estimated by equation (1) (above) with n=4. Applying equation (1) to assembly line 600, the estimated total positional tolerance is±0.600 mm. As will be recalled, the same frame assembly, produced with the same parts but on conventional assembly line 500 produced a total positional tolerance of±0.735 mm. That is, assembly line 600, embodying the invention, reduces the total positional tolerance of the frame assembly by approximately 20%. Similarly, the total manufacturing tolerance of assembly lines 100 and 600, according to equation (2), where n=4, m=2, and where each dimensional and positional tolerance is assumed to be±0.3 mm, is estimated at±0.735 mm, or approximately 30% less than the±1.039 mm introduced into the system by conventional assembly lines 10 and 500. Moreover, assembly lines 100 and 600, which embody the present invention, create an initial, and substantially rigid, structure to which, where possible, all other components are affixed, either directly or indirectly (that is, to other components added on to the initial structure prior), which substantially reduces the amount and degree of distortion introduced into the system as the partially completed assembly is moved from station to station and at various stations. In contrast, conventional assembly lines 10 and 500 have a substantial degree of distortion introduced into the manufacturing system because many of the components are not affixed to each other early in the manufacturing process, but are, rather, allowed to "float" (or easily disturbed from their positions relative to other components and to the positioning system) until much later in the manufacturing process. Moreover, conventional assembly lines 10 and 500, when a rigid structure is produced, such as the U-shaped structure on assembly line 10, the structure is not substantially rigid but is considerably flexible allowing the partially completed sub-assemblies to be distorted during the various processes involved in manufacture.

As will now be apparent, the formation of an initial substantially rigid structure with a reference point significantly reduces the amount of total manufacturing tolerance introduced during the assembly process as the assembly is transported from processing station to processing station. Moreover, regardless of the number of jigs, or other positioning mechanisms, used in the positioning of components that ultimately form the assembly to be manufactured, the amount of dimensional tolerance in the manufacture is only dependent on the number of independent reference points used. For example, in the operations of FIGS. 4, 8 and 9 only two independent reference points (that is, reference points that are not spatially fixed with respect to each other, such as reference points that are not on the same part or component) were used, namely a first reference point for the manufacture of the engine room sub-assembly and a second reference point for the assembly of the floor panel sub-assembly. Further, as will now be apparent, the use of a limited number of independent reference points allows for some parts to compensate for any dimensional or positional inaccuracies (or tolerances) of other parts. For instance, if the frame components which were affixed to the engine room sub-assembly in step S810 were dimensionally or positionally inaccurate, the positioning of the floor panel sub-assembly in step S816 not does not add to these inaccuracies, but, because the positioning of the floor panel sub-assembly is made with reference to the engine room sub-assembly's reference point, these dimensional or positional inaccuracies may be compensated by the accurate positioning of the floor panel sub-assembly relative to the engine room sub-assembly.

The aforementioned assembly processes can be used with the existing parts that are used in a conventional automotive assembly line, as was described above. However, the invention can also be applied to an entire manufacturing process. That is, the invention can embody the manufacturing of a product starting in the design phase of the product through to the manufacture of a complete product. Assembly line 600 was described with reference to the same parts used in the manufacture of the frame assembly on conventional assembly line 500. However, for some assemblies or products, the invention may be more effectively implemented by the top-down designing of an assembly process which minimises "stacking".

Figure 10:
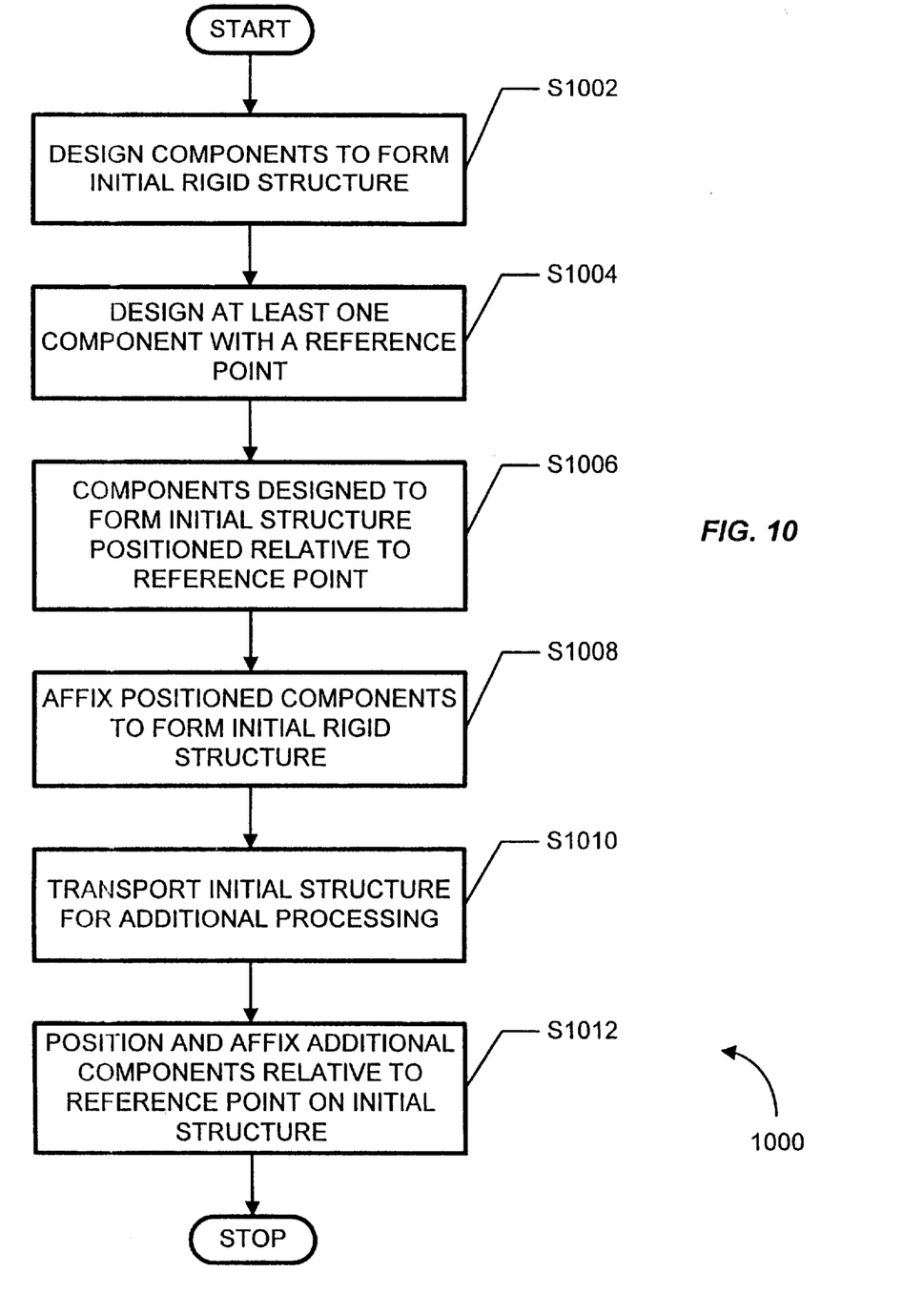
FIG. 10 is a flow chart illustrating a further embodiment of the invention in the manufacture of a product.

The invention may be embodied according to operations 1000 illustrated in the flowchart of FIG. 10. During the initial design of the product (fabricated of a plurality of components), individual components are designed to be able to form an initial rigid structure (S1002). Moreover, at least one of those components forming the initial rigid structure will have at least one reference point (S1004). The reference point, as described earlier, may, for example, be indicated by a reference hole, target, or any other identifying feature to which the positioning of other components will reference. In S1004 those components that were designed and selected to form the initial rigid structure are then positioned relative to each other with reference to at least one of the reference points (S1006). The selected and positioned components are then affixed to each other to form a rigid structure (S1008). The affixing may, as aforementioned, be through spot welding, adhesives, bolts, rivets, joints, fasteners, etc. The rigid structure is then transported through a number of additional processes, including the attachment of additional parts, through some fixation method (e.g., welding, adhesives, bolts, rivets, joints, etc.) (S1010). As was the case before, the additional parts are positioned and joined to the assembly with reference to the reference points on the initial structure (S1012). This is facilitated if the product is designed so that the additional parts are each directly affixed to the initial structure. However, direct affixation is not necessary, it is only necessary that the additional parts be referenced to the reference point(s) on the initial structure. Thus, the product should be designed so that these reference point(s) are not obscured as the product is built up. As is now apparent, step S1012 reduces the amount of dimensional and, therefore, total manufacturing tolerances that are ultimately built into the final product or assembly.

While the initial positioning of parts has been described herein as accomplished with jigs, this is not necessary. A product could be built up from parts with robots. Each parts would be referenced by a robot to a reference point on a initial structure or base part.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

We claim:

1. An assembly line, comprising:
    an initial station for forming a substantially rigid initial structure from a plurality of components, one of said plurality of components having a defined reference point, the remainder of said plurality of components being positioned with respect to said reference point; and
    at least one additional station downstream of said initial station, each of said at least one additional station comprising:
        a component positioner for locating said reference point of said initial structure and for positioning additional components based on a located position of said reference point of said initial structure; and
        an affixer for affixing said additional components to said initial structure at a position determined by said component positioner.

2. The assembly line of claim 1, wherein said affixer affixes said additional components in abutting relation to said initial structure.

3. The assembly line of claim 2, wherein said at least one additional station comprises a plurality of additional stations which are serially arranged.

4. The assembly line of claim 2, wherein said assembly line comprises a plurality of sub-assembly lines for the assembly of a plurality of sub-assemblies, and further comprising:
    assembly means for referencing and affixing said manufactured sub-assemblies to an initial structure manufactured on one of said plurality of sub-assembly lines.

5. The assembly line of claim 2 wherein said assembly line is for manufacturing vehicle sub-assemblies.

6. The assembly line of claim 2 wherein said component positioner is one or more of: a vision system and a handling robot.

7. The assembly line of claim 2 wherein said affixer for affixing said additional components affixes using one or more of: welding, adhesives, bolts, rivets, joints and fasteners.

8. The assembly line of claim 2 wherein said component positioner is a jig.

9. The assembly line of claim 1 wherein said plurality of components comprise a plurality of sub-assemblies.

10. The assembly line of claim 1 wherein said assembly line is for manufacturing vehicle assemblies.

11. The assembly line of claim 1 wherein said affixer is also for affixing said additional components to one another.

* * * * *